United States Patent [19]

Gourdine

[11] Patent Number: 4,916,033

[45] Date of Patent: Apr. 10, 1990

[54] METHOD AND APPARATUS FOR CONVERTING CHEMICAL AND THERMAL ENERGY INTO ELECTRICITY

[76] Inventor: Meredith Gourdine, 2227 Country Rd. #391, Pearland, Tex. 77581

[21] Appl. No.: 14,442

[22] Filed: Feb. 13, 1987

[51] Int. Cl.$^4$ .................. H01M 10/36; H01M 10/39
[52] U.S. Cl. .................................. 429/49; 429/101; 429/191; 429/193
[58] Field of Search .............. 429/27, 45, 59, 101, 429/49, 191, 193

[56] References Cited

U.S. PATENT DOCUMENTS

| 3,441,390 | 4/1969 | Backe et al. ........................... 429/45 |
| 4,178,418 | 12/1979 | Croset et al. ......................... 429/27 |
| 4,181,776 | 1/1980 | Lindstrom ............................. 429/27 |
| 4,320,181 | 3/1982 | Habich et al. ......................... 429/59 |
| 4,322,483 | 3/1982 | Tune ..................................... 429/27 |
| 4,362,793 | 12/1982 | Bittihn et al. ........................ 429/191 |
| 4,462,891 | 7/1984 | Lawless ............................... 429/191 |
| 4,477,541 | 10/1984 | Fraioli ................................. 429/191 |
| 4,565,749 | 1/1986 | Ommering et al. .................... 429/27 |
| 4,582,766 | 4/1986 | Isenberg et al. ...................... 429/193 |
| 4,615,954 | 10/1986 | Solomon et al. ...................... 429/27 |
| 4,673,624 | 6/1987 | Hockaday ............................ 429/49 |

Primary Examiner—Donald L. Walton
Attorney, Agent, or Firm—David M. Ostfeld

[57] ABSTRACT

Thin film dissimilar metals sandwiching a thin film of non metal that is permeable to oxygen molecules and ions to convert chemical and thermal energy into electrical energy in an external resistance is disclosed.

7 Claims, 4 Drawing Sheets

METHOD AND APPARATUS FOR CONVERTING CHEMICAL AND THERMAL ENERGY INTO ELECTRICITY

BACKGROUND OF THE INVENTION

1. Field of the Invention

The Invention relates to batteries and more particularly to high performance batteries and cells.

2. Background Art

For the past few decades there has been an accelerating effort to develop high performance batteries for applications such as electric vehicles, load levelling, solar electric energy storage, and other industrial, commercial, residential and military uses. Except for the all solid-state lithium battery, these developments involve high temperature chemical reactions at the interfaces of electrolytes and metals to achieve high current density and power. The reaction at opposing interfaces are chosen to yield highest possible open circuit voltages in order to achieve maximum stored electrical energy per pound. Unfortunately, so much weight must be invested in the structure of these batteries, to contain the violent reactions within, that the specific stored energy is much less than theoretically predicted.

FIG. 7.7 from F. D. Richardson and J. H. E. Jeffes, *J. Iron Steel Inst.*, 160, 261 (1948), Modified by L. S. Darken and R. W. Gump, *Physical Chemistry of Metals*, McGraw-Hill, N.Y., 1953, taken from "THERMODYNAMICS OF SOLIDS"; Swalin, R. A., John Wiley and Sons, Inc. N.Y.; Copyright 1962 is a plot of specific power vs. specific stored energy of several batteries including some of the exotic high temperature batteries under development. Two of the highest performance cells are the sodium/sulfur and the Lithium/Chlorine cells which operate at temperatures well above 1000° F. Theoretically, they should have more than ten times the specific stored energy shown, but the massive structure of the electrodes and the containment material imposes very low practical limits.

Despite their high performance, none of these high temperature exotic batteries are candidate for mass production, because they are too fragile, unreliable, costly, and pose unusual safety hazards. See Kirk-Othmer, "ENCYCLOPEDIA OF CHEMICAL TECHNOLOGY" Vol. 3 on Primary and Secondary Batteries and Cells, High Temperature; and "LEAD-/ACID—STILL TOP OF THE GALVANIC TRACTION PILE IN 1983" D. A. J. Rand, Journal of Power Sources, 11 (1984) 119-126.

The only modern battery that is an exception to these limitations is the all solid-state lithium battery. See "AMBIENT TEMPERATURE RECHARGEABLE LITHIUM CELLS: STATE OF THE ART: PROBLEMS AND OPPORTUNITIES; Brummer, S. B., Corp. Source-EIC Labs. Inc., Newton, Mass. Journal Vol.—u8311; Technical report, Dec. 1982. These batteries consist of relatively thin film Lithium separated from an ion insertion compound like Titanium Disulfide, by an organic film like Polyacetylene Oxide, which can pass Lithium ions with relatively little resistance. Such cells are limited to an operating temperature slightly above room temperature because Lithium and the Organic separator would melt at higher temperatures. Nevertheless, cells and batteries have been built with specific power as high as 100 watts/lb and specific stored energy as high as 100 watt-hrs./lb, and progress continues. However, it is unlikely that such batteries will prove practical for mass production of vehicle batteries or load levelling batteries, because Lithium is a relatively rare and expensive metal. It is also a dangerous metal for humans to contact.

All of these electrochemical cells obey the laws of thermodynamics, from which is derived the Gibbs-Helmholtz relationship that gives their open-circuit voltage, $$V_{oc} = (\Delta H^{\circ} + dV_{oc}/dT)/Q$$

where $\Delta H^{\circ}$ is the standard heat of formation of chemicals formed when charge Q is transferred around the circuit, and $T\, d\, V_{oc}/dT$ is the amount of heat absorbed from the cell surroundings at temperature T. See "PRINCIPLES OF ELECTRICITY", Page, L., Ilsley Adams, N. PhD 4th Edition, D. Van Nostrand Co., Princeton, N.J. Usually the second term, the so-called entropic term, of the Gibbs-Helmholtz relationship is so small compared to the first that it is ignored in designing most electrochemical cells.

In recent years, scientific investigators have been studying the ability of semiconductors to conduct ions at high temperatures. See "SOLID IONIC CONDUCTORS", Chemical and Engineering News May 20, 1985, by Duward F. Shriver, Gregory C. Farrington. However, these studies do not anticipate the use of nonmetallic conductors as thin film separators between dissimilar metals nor do they teach the use of entropic effects to achieve thermal energy conversion, nor do they teach the use of porous material that allows the cell to breathe gases in and out. Finally, none of this art anticipates the use of humidity and other additives as practical methods for reducing the resistivity of the non-metallic separators.

It is an object of this invention to achieve high performance characteristics like that shown in the above-referenced FIG. 7.7 with thermovoltaic batteries.

Another object of this invention is to choose the material in the battery such that the battery is commonly inexpensive, easily fabricated and non hazardous.

Another objective of this invention is to describe combinations of materials that can convert substantial amounts of thermal energy in the battery environment directly into electricity.

Another objective of this invention is to describe combinations of materials that will allow a battery to chemically regenerate itself as it converts thermal energy into electricity.

DISCLOSURE OF THE INVENTION

Thermovoltaic cells comprising a pair of dissimilar metals sandwiching a non-metal such that there is a different oxidation-reduction reaction occurring at each interface, thereby inducing an EMF between the metal electrodes, are disclosed. Typically a battery of this sort comprises thin laminations of dissimilar metals separated by a non-metal that readily passes oxygen ions. Such solid state batteries, having little or no structural material can have relatively high specific power and stored electrical energy.

As current flows, the metal of the negative electrode oxidizes and the metal oxide on the positive electrode is reduced. There are no secondary reactions and the current density is so low that there are no irreversible physical changes at the interfaces; hence, the process is reversible and the cell can be recharged. Current density and specific power are limited by the resistance of the non metallic separator. The minimizing of resistance by decreasing thickness, operating at elevated temperature, and seeding the separator material with selected molecules is also disclosed. To compensate for low current/area, thermovoltaic batteries are composed of a multiplicity of thin film cells having an extremely large area/volume. Also, the specific stored energy of these cells is larger than that of high temperature electrolytic batteries because very little weight has to be invested in electrode and containment structures.

If carbon is one of the electrodes, the thermal energy converted to electricity is comparable to or greater than the chemical energy converted to electricity, and that there are unexpected benefits to be derived from such cells; e.g. a copper/copper oxide/carbon cell, if recharged at a lower temperature then its discharge temperature, requires less energy input, the difference coming from the thermal environment; nickel/nickel oxide/carbon cell if operated alternately above and below 250° C. recharges itself, with the electrical energy coming from the thermal environment. These batteries breathe gases in and out, unlike hermetically sealed electrolytic type batteries.

Cells of graphite/metal oxide/pulverized coal, which economically convert the potential energy of coal into electricity and heat without the polluting effects of combustion are also disclosed.

A porous cell of graphite/separator/granulated activated carbon that can inject a mixture of air and hydrocarbon fuel that is converted into electricity and heat, with carbon dioxide and water as by products is also disclosed.

Thermovoltaic cells that can deliver high specific power and stored energy while operating close to room temperature, if they are operated in a humid environment, are also disclosed. The silver/air/aluminum, or graphite/air/aluminum battery seems ideally suited for vehicle propulsion. It is theoretically possible to build a 100 hp battery weighing 570 lbs., occupying 3.18 ft$^3$, and capable of running 16 hours before recharging.

BRIEF DESCRIPTION OF THE DRAWINGS

For a further understanding of the nature and objects of the present invention, reference should be had to the following drawings, taken in conjunction with detailed description of the preferred embodiments, in which like parts are given like reference numerals and wherein.

DESCRIPTION OF THE PREFERRED EMBODIMENTS

Figure 1:
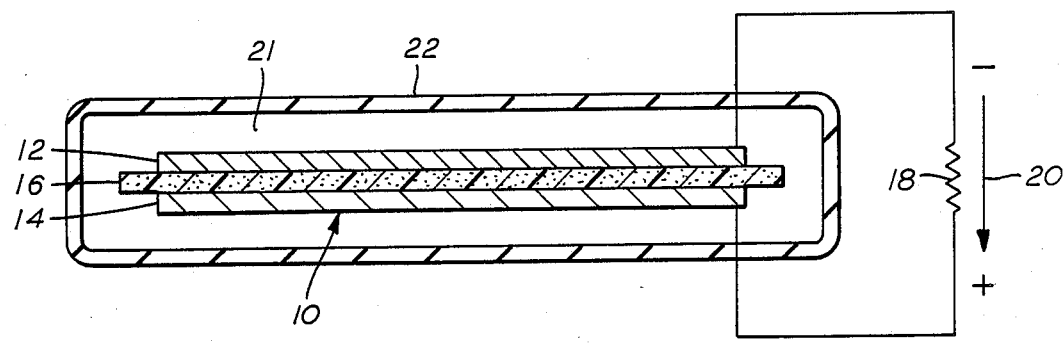
FIG. 1 is an enlarged, cross-sectional view of a thermovoltaic cell of the preferred embodiment of the present invention.
Figure 2:
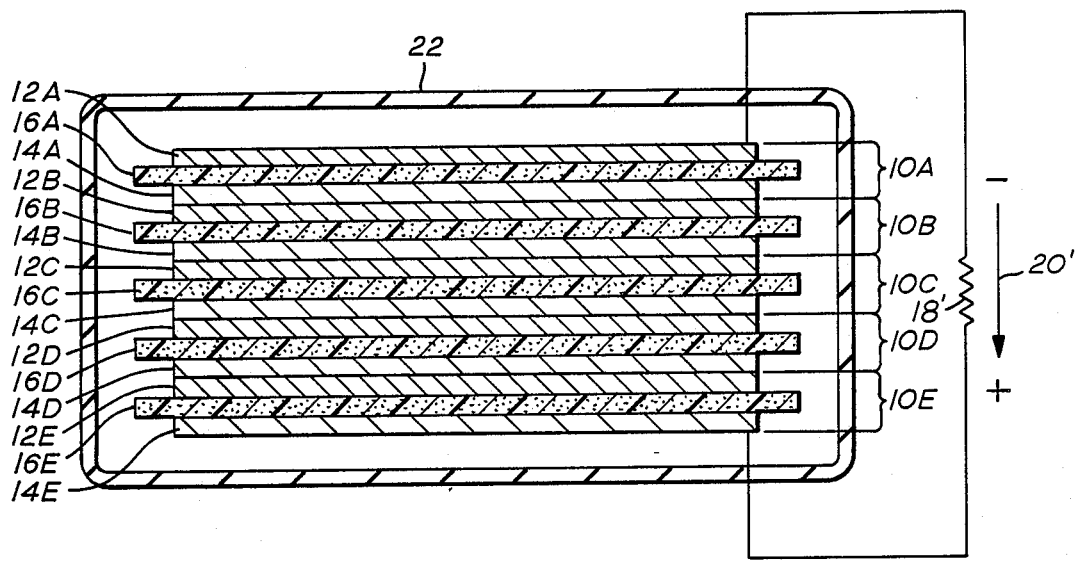
FIG. 2 is a schematic of a stacked set of thermovoltaic cells of the preferred embodiment of the present invention internally connected in series to increase voltage.

As shown in FIGS. 1 and 2, a battery 10 is comprised of one or more cells having thin laminations 12, 14 of a pair of dissimilar metals (or conductors) separated by, or sandwiching, a corresponding number of non metal (or dielectric) portion 16 that is sufficiently porous to allow the diffusion of oxygen molecules and ions (not shown).

The non-metal separator 16 must be sufficiently porous that oxygen molecules and/or ions can diffuse through it; oxygen ions being formed by the attachment of electrons (thermionically emitted by the cell materials) according to the reaction;

$$O_2 + 4e^- = 2O^{--} \tag{2}$$

At any typical metal non-metal interface, with oxygen present, there is the following oxidation-reduction equilibrium established:

$$M + 4O^{--} = 2MO + 4e^- \tag{3}$$

where, for the sake of discussion, M represents any double-valenced metal, $e^-$ represents an electron, and $O^{--}$ represents an oxygen ion.

The existence of negatively charged oxygen ions in front of the metal 12, 14 means that positive charge must be on the surface of the metal, thereby inducing a positive potential between the non-metal and the metal of value $\Delta\Phi$.

But, the electrical work required to move four electrons out of metal on oxygen ions must equal the gain in chemical free energy when the oxide is reduced to metal; i.e.

$$4e\Delta\Phi = \Delta G° \tag{4}$$

Figure 7:
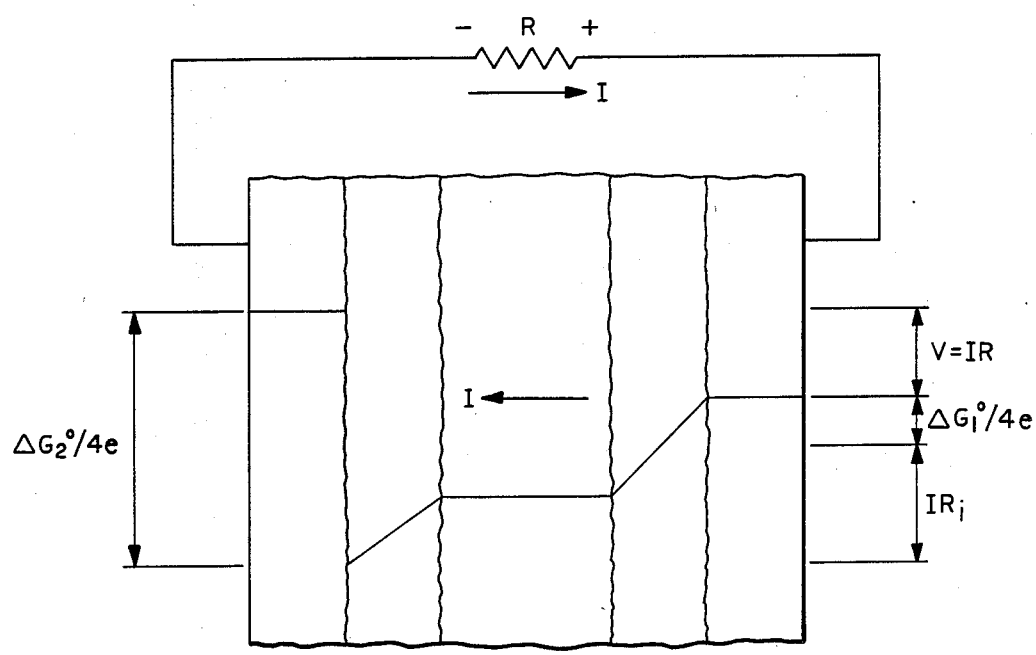
FIG. 7 is a detail of a thermovoltaic cell.

Fortunately, the change in standard free energy (per mole of $O_2$) is well known as a function of temperature for the oxidation of most metals, see for example FIG. 7.7 of "THERMODYNAMICS OF SOLIDS"; Swalin, R. A., John Wiley and Sons, Inc. N.Y.; Copyright 1962. This is a plot of $\Delta G°$ vs. T for the oxidation of various metals,

$$\Delta G° = \Delta H° - T\Delta S° \tag{5}$$

where $\Delta S°$ is the change in standard free entropy for the oxidation process. $\Delta G°$ is negative, representing a loss in chemical free energy as oxidation occurs.

Using these plots, it is easy to calculate the EMF between two electrodes with different oxidation-reduction reactions; i.e. the open circuit voltage is $$V_{oc} = (\Delta G_2^\circ - \Delta G_1^\circ)/4e \quad (6)$$
$$= \Delta G_{1,2}^\circ/4e$$
$$= 1.06 \times 10^{-2} \Delta G_{1,2}^\circ$$

where $V_{oc}$ is in volts and $\Delta G^\circ_{1,2}$ is in kg-cal/mole $O_2$, as in FIG. 7.7 referenced above. Using eq. (6) and FIG. 7.7 in the above-reference mentioned by Richardson and Jeffes, $V_{oc}$ of FIG. 7 can be determined using $V_{oc}$ vs. T for several interesting cells.

Thus, for example, in FIG. 7.7 referenced above, if the cell is Cu—$Cu_2O$— $AL_2O_3$—AL, then at T=50° C., $$V_{oc}=1.06\times10^{-2}(250-69)=1.89 \text{ volts}$$

Figure 8:
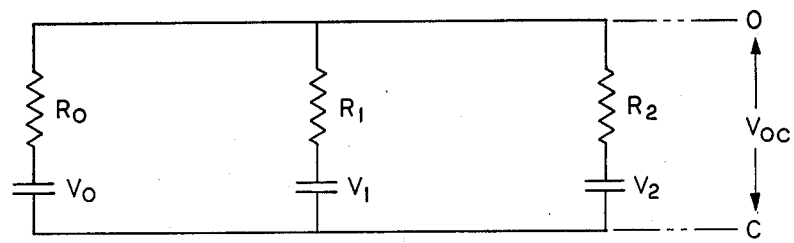
FIG. 8 is an equivalent circuit for a complex thermovoltaic cell.

FIGS. 7 and 8 depict schematically the operation of a thermovoltaic cell as described above. In FIG. 7, when an external resistance R is connected between the two metals, an electron current I flows around the circuit as shown. The negative electrode is the one being oxidized (and having the largest free energy change $\Delta G_2^\circ$), while the positive electrode is the one being reduced (and having the smallest free energy change $\Delta G_1^\circ$). The electron potential energy levels across the cell are also shown in FIG. 7. The voltage-current relationship is obtained directly from this electron potential energy level diagram; i.e.

$$V=V_{oc}-IR_i \quad (7)$$

where $V_{oc}$ is given by eq. (6), and V=IR, the voltage across the cell.

In practical cells the metals and oxides are usually not pure, then the open-circuit voltage is due to a combination of cells in parallel as shown schematically in FIG. 8. Analysis of this equivalent circuit shows that;

$$V_{oc} = \frac{V_0/R_0 + V_1/R_1 + V_2/R_2 + \ldots}{1/R_0 + 1/R_1 + 1/R_2 + \ldots}$$

But, $R_{0,1,2}=\Delta \cdot S/A_{0,1,2}$, respectively where $\Delta$ is resistivity, S is spacing, and $A_{0,1,2}$ is the area of the cells 0,1,2, respectively. Therefore, $$V_{oc}=(V_0A_0+V_1A_1+V_2A_2+\ldots)/A \quad (7a)$$

where $A=A_o+A_1+A_2+\ldots$ is the total area of the complex cell.

The open-circuit voltage of a complex cell is therefore the area weighted average of the voltages of the sub-cells. This means that if for some reason $V_o=0$; then, there is an internal load on the cell that reduces $V_{oc}$.

The stored energy/mass of this sample cell (AL/$AL_2O_3$/$Cu_2O$/Cu)

$$\frac{\text{stored energy}}{\text{Mass}} = \frac{\text{Free energy/mole } O_2}{\frac{\text{Mass } O_2}{\text{Mole } O_2} + \frac{\text{Mass Cu}}{\text{Mole Cu}} \cdot \frac{\text{Mole Cu}}{\text{Mole } O_2} + \frac{\text{Mass Al}}{\text{Mole Al}} \cdot \frac{\text{Mole Al}}{\text{Mole } O_2}} \quad (8)$$

$$= \frac{\text{Free energy/mole } O_2}{\text{Mol.Wt.}O_2 + \text{Mol.Wt.Cu} \cdot \frac{\text{Mole Cu}}{\text{Mole } O_2} + \text{Mol.wt.Al} \cdot \frac{\text{Mole Al}}{\text{Mole } O_2}}$$

$$= \frac{(250 - 69) \times 10^3}{32 + 63.6 \times 4 + 27 \times 4/3}$$
$$= 529 \text{ kg-cal/kg}$$
$$= 2.22 \times 10^6 \text{ joule/kg}$$
$$= 9.66 \times 10^2 \text{ BTU/lb}$$
$$= 127 \text{ watt-hr/lb}$$

With two modifications, the energy/mass of this cell can be greatly increased. First, eliminate all the copper and copper oxide in favor of aluminum with vacuum deposited silver only a few molecules thick. This surface is a catalyst for the formation of oxygen ions according to eq. (2). Second, use $Al_2O_3$ powder as the non-metal spacer, leaving sufficient voids for the cell to breathe air. Then, stored energy/mass can be recalculated using eq. (7), $$\frac{\text{Stored Energy}}{\text{Mass}} = \frac{250 \times 10^3}{0 + 36 + 36}$$
$$= 3.17 \times 10^3 \text{ (kg-cal)/kg}$$
$$= 1.45 \times 10^7 \text{ joules/kg}$$
$$= 6.26 \times 10^3 \text{ BTU/lb}$$
$$= 2.44 \text{ hp-hr/lb}$$
$$= 1860 \text{ watt-hr/lb}$$

This is a larger stored energy/mass than most commercial cells, and much cheaper to manufacture. It is also rechargeable, and can be discharged without danger of polarization.

The maximum, or short-circuit current that can be drawn from the cell is limited by its internal resistance $R_i$, because $$I_{sc}=V_{oc}/R_i \quad (9)$$

The maximum power that can be drawn from a cell occurs when the external resistance R equals the internal resistance $R_i$, and it is $$P_{max}=V_{oc}I_{sc}/4=V^2_{oc}/4 R_i \quad (10)$$

Plots of V vs. I for thermovoltaic cells appear to be straight lines, indicating the cell has an internal resistance given by the formula $$R_i=S/Aen_ek_e \quad (11)$$

where $en_ek_e$ is the electrical conductivity of the separator (and/or oxides), e is the charge of an electron (or ions) carrying the current, $n_e$ is their concentration, and $k_e$ is their mobility.

Internal resistance generally decreases rapidly as temperature is increased. This is primarily due to the increase of electron concentration in the conduction band of semi-conductors, or the concentration of ionelectron pairs in a gas, as given by Boltzman's relationship $$n(T) \alpha \exp(-eV_g/kT) \quad (12)$$

where k is Boltzman's constant, and $V_g$ is the forbidden band gap voltage of a semi conductor, or the first ionization potential of a gas.

Since $k_e$ is relatively insensitive to temperature, eq. (11) gives $$R_i/R_{Inf} = \exp(eV_g/kT) \quad (13)$$

where $R_{Inf}$ is the hypothetical resistance that would result as T approaches infinity, where all valence electrons would be free to conduct; i.e.

$$R_{Inf} = S/Aen_e(Inf) k_e \quad (14)$$

and $n_e$ (Inf) equals the concentration of valence electrons. By measuring $R_i$ at two temperatures, eq. (13) can be used to calculate both $V_g$ and $R_{Inf}$. In particular, if $R'_i$ is the resistance at $T'$ and $R_i$ is the resistance at T, then eq. (14) gives $$R'_i/R_i = \exp(-e V_g/kT)(1 - T/T') \quad (15)$$

For example, measuring a cell constructed of this type may have an area $A = 10^{-4}$ m$^2$ and with an air gap of $S = 10^{-6}$ m and measured $R_i = 10^{10}$ ohms at $T = 300°$ K. (78° F.). The first ionization potential of air is $V_g = 12.1$ volts. Therefore, eq. (15) predicts that $R'_i = 4.26 \times 10^3$ ohms at $T' = 306°$ K. $= 91.4°$ F. This agrees fairly well with experiments.

This invention teaches several ways to decreases internal resistance:
(1) Choose separator materials 16 with $V_g$ as small as possible. They may be intrinsic semiconductors or gases.
(2) Choose separator materials 16 with $n_e$ (Inf) as large as possible, so that $R_i$(Inf) is as small as possible. This means dense intrinsic semi-conductors and/or high pressure gases.
(3) Intrinsic semi conductors, and/or gases can be seeded with donor impurities that effectively decrease $V_g$ and decrease R by increasing $n_e$ (Inf).
(4) Increase temperature up to the melting point of the materials 12, 14 for open cells.
(5) Decrease thickness of the separator materials 16 to the limit at which the electric field reaches the breakdown strength of the material, $E_b$. i.e.

$$S_{min} = V_{oc}/E_b \quad (16)$$

Typically, solid-state semiconductors have $E_b = 10^7$ v/m, and since $V_{oc}$ is approximately 1.0 volt, $S_{min}$ is approximately $10^{-7}$ m. In gases at one atmosphere pressure, $E_b$ is approximately $10^6$ v/m; so $S_{min}$ is approximately $10^{-6}$ m.

The internal resistance of cells with porous separators can be reduced a great deal by putting a small quantity of easily ionized alkali metal vapor within the thermal enclosure.

Using eq. (13) and in the equation an asterisk denotes the properties of the seeded cell:

$$\frac{R^*_i}{R_i} = \frac{n_e(Inf)}{n^*_e(Inf)} \exp\left(-\frac{e}{kT}(v_g - V^*_g)\right)$$

where $n(Inf)/n^*(Inf) = n_o/n_s$, the relative concentration of oxygen to alkali seed molecules.

For example, $V_g = 12.1$ volts for $O_2$ and $V^*_g = 3.9$ volts for Cs; so, at room temperature where $kT/e = 1/40$ volts, $$R^*_i/R_i = (n_o/n_s)\exp(-328)$$

Therefore, even with $n_o/n_s$ much greater than one, as it generally is, $R^*_i/R_i$ is much less than one. This means that if a tiny amount of Cs metal is added to the enclosed cell 10, a large reduction in internal resistance results. Cs is the preferable choice from the alkali metals, Li, Na, K, and Rb, because it has the lowest ionization potential. Although there is a tendency for Cs molecules to oxidize, Al will reduce the oxide, thereby maintaining adequate Cs vapor pressure.

According to eq. (7A), the open-circuit voltage would be reduced only slightly by adding a relatively small concentration of alkali seed vapor, because the fraction of area wetted by this material would be extremely small. By comparison, $N_2$ in the air would wet more than one half the area, producing no voltage on this portion, while $O_2$ wets the remaining area producing 1.89 volts; hence, $V_{oc}$ would be reduced to less than one half the value for pure $O_2$. Any other inert molecules on the surface would do the same thing. $V_{oc}$ is also reduced if there are insufficient oxygen molecules to attach electrons thermally generated in the semi conductors, before they strike the electrode, because a large portion of the electrode is wetted by electrons that generate no voltage. Tests of a Cu—Polymer—Al cell in a vacuum chamber confirm this because $V_{oc}$ vanishes as air pressure is reduced; however, the internal resistance of the cell remains practically constant. This cell gradually regains its original $V_{oc}$ after several hours in air.

As this type cell discharges, the layer of $Al_2O_3$ that grows on the Al increases the resistance proportional to its thickness, because it too is a semi-conductor. Therefore, the cell should be recharged, before $R_i$ becomes too large, by applying a voltage larger than $V_{oc}$ and reversing the current. During recharging, the $Al_2O_3$ reverts to Al with the cell expelling $O_2$.

The maximum power from this cell is;

$$P_{max} = V_{oc}^2/4R_i = (2.65)^2/4 \times 4.26 \times 10^3$$

$$= 4.12 \times 10^{-4} \text{ watt}$$

because the cell area is $A = 10^{-4}$ m$^2$.
The maximum power/area is;
$P_{max}/A = 4.12$ watts/m$^2$ By stacking these cells 16 atop one another (FIG. 2) such that they are connected electrically in series, the voltage is multiplied by the number of cells; and, if commercially available aluminum foil with $S_1 = 1.0$ mil thick is used (coated on one side with silver), then the power/volume is $$W_{max} = P_{max}/A (S+S_1) = 4.12/25 \times 10^{-6}$$

$$= 1.65 \times 10^5 \text{ watts/m}^3$$

This compares well with most commercial cells, and it can be increased further by using thinner aluminum foil, which is commercially available down to 0.25 mil thick.

In this example, a battery 10 of such cells would be almost solid aluminum, with a density $(\rho_{Al})$ of $Al = 2.7 \times 10^3$ kg/m$^3$; so its maximum power/weight ratio is $$W_{max}/\rho_{Al} = 1.65 \times 10^5/2.7 \times 10^3$$
$$= 61.1 \text{ watts/kg}$$
$$= 3.70 \times 10^{-2} \text{ hp/lb}$$
$$= 21.8 \text{ watts/lb}$$

Or, conversely, the minimum weight/power ratio is:

$$\rho_{Al}/W_{max} = 16.4 \text{ gm/watt} = 27.0 \text{ lb/hp}$$

Thus, a rechargeable electric battery for a 100 hp car would weigh 2700 lbs. and occupy 16.0 ft.$^3$. Such a battery could be operated without recharging up to:

$$\frac{2.44 \text{ hp-hr/lb}}{3.70 \times 10^{-2} \text{ hp/lb}} = 66 \text{ hrs.}$$

The weight and size can be reduced as much as a factor of four by using thinner aluminum foil. For example, if the foil is ¼ mil thick, then, the weight of the battery is 675 lbs. and occupies 4.0 ft.$^3$. In this case, the battery can run up to:

$$\frac{2.44 \text{ hp-hr/lb}}{4 \times 3.70 \times 10^{-2} \text{ hp/lb}} = 16.5 \text{ hrs.}$$

No commercial chemical batteries offer this possibility. The cost of this battery can be substantially reduced without sacrificing performance if the silver coated Aluminum electrode (+) is replaced by a thin film of graphite. This also decreases weight.

A study of FIG. 7.7 discussed above shows that $V_{oc}$ decreases with temperatures. Therefore, it could be recharged with less energy at higher temperatures. Unfortunately, for aluminum cells, aluminum melts around 654° C.; so there is not much advantage. However, titanium is also a light weight metal, and it melts at 1800° C.; so, if titanium were used instead of aluminum in the cell, full advantage could be taken of this energy savings. For example, if the cell is operated at 50° C. where $V_{oc} = 2.14$, and then recharged at 1800° C. where $V_{oc} = 1.33$; then, the fraction of energy saved in recharging (excluding the energy cost to elevate the cell's temperature) is;

$$(2.14 - 1.33)/2.14 = 0.379$$

It is evident from FIG. 7.7 of "THERMODYNAMICS OF SOLIDS"; Swalin, R. A., John Wiley & Sons, Inc. N.Y.; Copyright 1962 that Thermovoltaic cells having carbon as one of the electrodes have a larger entropic effect because most of the oxidation reaction lines are almost parallel, except for Carbon.

Four examples of this are given in FIG. 7.7 discussed above;
(1) C(−)—Ag or Au(+)
(2) C(−)—Cu(+)
(3) C(+)—Al(−)
(4) C(+)—Ni(−)(below 250° C.) C(−)—Ni(+)(above 250° C.)

The first two examples have d $V_{oc}$/dT <zero, meaning that the $V_{oc}$ decreases with temperature; so, to conserve energy, this type of cell should be discharged at low temperature and recharged at high temperature. The third example is just the opposite. For the third example, to conserve energy, it should be discharged at a high temperature and recharged at low temperature.

The fourth example is the most interesting because the cell changes polarity at T=250° C. When it is discharged at temperature below 250° C., nickel is oxidized and is the negative electrode, Ni (−). When it is discharged at a temperature above 250° C., the cell makes carbon oxidize and becomes the negative electrode, C (−). Thus, the cell automatically regenerates itself if the cell is discharged alternately above and below the critical temperature T=250° C. In this event, the electrical energy for the output comes from the heat stored in the environment of the cell.

In each of these examples with Carbon electrodes, provision must be made for the cell to breathe gases in and out; i.e. $O_2$, $CO_2$, and CO at temperatures above 700° C.

Figure 4:
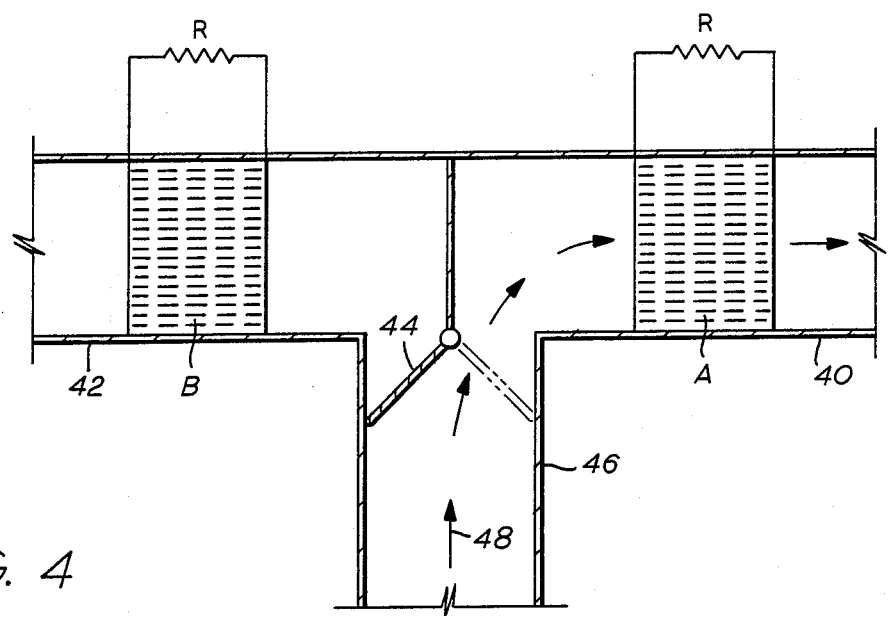
FIG. 4 is a schematic showing a pair of thermally regenerated C-Ni batteries of the preferred embodiment of the present invention used to extract waste heat from combustion gases.

This special feature can be put to use in converting some of the waste heat in combustion gas to electricity. The hot gas can be directed alternately around a pair of C—Ni batteries so that they are alternately exposed to gases well above and well below the critical temperature T=250° C. (FIG. 4).

The resistivity of the non-metal separator 16 also can be reduced by operating the cell 10 in a humid environment at relatively low temperatures. This makes it possible to build small thermovoltaic cells, which do not generate enough joule heat to reach high temperature, but by operating them in a humid environment, they can achieve specific power comparable to that of the large high temperature thermovoltaic batteries. Also, the graphitic form of carbon behaves very much like gold or silver because it resists oxidation and readily transfers electrons as oxygen ions strike the surface. This is the situation at temperatures up to around 1000° F. On the other hand, carbon like that in coal oxidizes readily, and cells utilizing these two forms of carbon can be built in which oxygen permeating the cell becomes ionized at the graphite, and oxidizes the carbon when current is allowed to flow through an external load. This type of cell provides the means for converting the chemical energy stored in coal directly into electricity without combustion. Its practicality depends upon the development of a suitable non metallic separator that is porous to oxygen. One possibility is Aluminum Oxide powder that has spaces much smaller than the size of either graphite powder or the pulverized coal so that the two cannot contact each other. The Electrogasdynamic coating system (U.S. Pat. No. 4,433,003, issued Feb. 21, 1984) is preferably used for making laminations of these materials. The result is a primary battery that consumes pulverized coal with the other materials being of such low cost that they can be discarded after the coal is consumed. This is only one example of how the coal oxidizing thermovoltaic battery can be built, and should not be considered limiting.

There are many ways in which current can be conducted through the non-metallic separator 16 of the thermovoltaic cells 10. If the separator is a powder with connected spaces, the oxygen ions can move through the spaces between particles, or over their surfaces. If they are moving over the surface, the humidity would play a large role in reducing resistivity. If they are moving through the spaces, then the addition of easily ionized seed material such as nitrous oxide vapor would provide electrons that could attach to oxygen molecules and increase oxygen ion current. Seed material added to the solids could also have the same effect.

If the separator 16 is a solid, either amorphous or crystalline, oxygen could be displaced through this material by jumping from one vacancy to another. See "SOLID IONIC CONDUCTORS", Chemical and Engineering News May 20, 1985, by Duward F. Shriver, Gregory C. Farrington. In spite of the fact that the exact mechanism for conduction is unknown, resistance can be reduced by several methods: (1) careful selection of the chemical and physical properties of the non metallic separator, (2) addition of certain seed material to the separator in the solid, liquid, or gaseous state, that donate free electrons (3) operation at elevated temperatures, (4) decreasing the thickness of the non metallic separator, (5) humidifying the environment and (6) adding easily ionized gasses like NO or Cs to the environment.

Resistivity and thickness of the non metallic separator 16 appear to be the dominating factors in determining the specific power of the thermovoltaic cell. For example the electrogasdynamic coating method ("EGD") is most advantageous because it can electrostatically pack layers as thin as $10^{-6}$ m, provided that particles this fine are available. Furthermore, these laminations can be applied wet or dry; however, dry is preferrable. Although it is possible to do this with vacuum deposition techniques used to make submicron electronic devices, this is an impractical approach because the rate of delivering mass with such a system is very slow compared to that of the EGD coating system.

It is also possible to build thermovoltaic cells and batteries 10 with thin laminations of only two components, a metal 12, 14 and a dissimilar metal oxide 16. For example, graphite, which behaves like gold or silver, and aluminum oxide or magnesium oxide may be used. Laminations of these materials produce fully discharged cells of graphite/metal oxide/graphite; however, by running current through such cells, oxygen is displaced from one side of the metal oxide to the other and form a cell of graphite/metal oxide/metal/graphite. The thickness of the metal increases as the charging current continues. Finally, when the cell is allowed to discharge through an external load, oxygen trapped in the cell, or breathed into the cell, becomes ionized on the graphite, the ions pass through the metal oxide and oxidize the metal, releasing free energy in the form of electric current flowing in the external resistance. Two component cells of this type are less expensive to build, but their normal state is fully discharged because eventually oxygen will diffuse back to the metal and oxidize it. This is a very slow process even at high temperature compared to the rate at which the metal is oxidized when the cell is allowed to discharge through a load. See "DISPLACEMENT REACTIONS IN THE SOLID STATE"; Rapp, R. A., and Yurek, C. Y., MET. TRANS. 4, 1283 (1973) and "KINETICS OF THE DISPLACEMENT REACTION BETWEEN IRON AND $CU_2O$" Yurek, C. Y., Rapp, R. A., and Hirth, J. P., MET. TRANS. 4, 1293 (1973). This type battery 10 is ideally suited for applications in which the battery is to be frequently discharged and recharged; e.g. vehicle and load levelling batteries. In contrast, three component batteries are stored for long periods of time in a fully charged condition ready for instant use. These batteries are ideally suited for applications like emergency power supplies. However, they too can be recharged because, as with the two component batteries, there are no substantial side reactions that deteriorate the components of the battery. They can be discharged and recharged for an indefinite number of cycles.

It also is possible to reduce the oxides of many metals using thin laminations of pulverized coal. If the free energy of the metal in the oxide is higher than the free energy of the carbon in the coal, then the metal oxide will automatically reduce and form carbon dioxide as electric power is delivered to an external load. For example, FIG. 7.7 of "THERMODYNAMICS OF SOLIDS"; Swalin, R. A., John Wiley & Sons, Inc. N.Y.; Copyright 1962 shows that copper oxide can be reduced at any temperature while nickel oxide can be reduced at temperatures above 250° C. and iron oxide at temperatures above 700° C. This observation makes it appear possible to generate many metals with pulverized coal without combustion, smoke stacks, air pollution, etc. In fact, by using coke instead of pulverized coal, there will be no ash when the process finishes, only the pure metals. The by products of such reactions are an abundance of clean electricity.

The oxygen partial pressure in the separator 16 may be due to oxides in the dielectric of separator 16 or due to diffusion of oxygen into the cell 10 from its surroundings 21, or both.

The cell 10 may be located within a thermal enclosure 22 where the temperature is maintained uniformly at a temperature T. The cell 10 is connected to an external load 18, 18', 18'' shown illustratively as a resistive load, in FIGS. 1, 2, 3, through which a current (or electron flow) 20, 20', 20'' flows.

Because of the chemical equilibrium of the oxidation and reduction reactions at each electrode surface, as discussed above there is an EMF induced between the metal surfaces 12, 14 and the dielectric 16 adjacent to them:

$$\Delta \Phi_{1,2} = \Delta G°_{1,2}/4e,$$

where G° is the standard free-energy of the oxidation reaction per mole $O_2$ as given in FIG. 7.7 of "THERMODYNAMICS OF SOLIDS"; Swalin, R. A., John Wiley & Sons, Inc. N.Y.; Copyright 1962 as a function of T, and e is the charge of an electron. The EMF, or open-circuit voltage between electrodes 12, 14 is therefore, $$V_{oc} = (\Delta G°_2 - \Delta G°_1)/4e$$

$$= \Delta G°_{1,2}/4e$$

When external resistance 18 is connected between the two metals 12, 14, electron flow 20 occurs from the negative electrode through the resistance 18 to the positive electrode (FIG. 1). Simultaneously, a negative oxygen ion flows from the positive electrode 14 through the dielectric 16 to the negative electrode 12. Thus metal is oxidized at the negative electrode 12, and metal oxide is reduced at the positive electrode 14, except in the special case where the positive electrode 14 is a noble metal such as Ag or Au. In the case of the noble metals, oxidation does not occur, but oxygen molecules are dissociated and ionized by electrons from the noble metals. The noble metals act as catalyst for this reaction.

The internal resistance of this cell to the flow of current is due to collisions between the oxygen ions and/or electrons with the molecules of the dielectric separator 16. Therefore, to minimize resistance, the dielectric separator 16 should preferably be made as thin and/or porous as possible.

An interesting possibility in the Cu(+)—C(—) cell of FIGS. 1, 7, 8 is to provide it with a removable thermally insulating enclosure 21. Then, if the cell 10 is discharged within this enclosure, its temperature will rise due to the joule heat generated by current through its internal resistance; as a result, voltage and power output will also increase. Such a thermal enclosure could also be used to advantage with the C(+)—Al(—) cell of FIGS. 7, 8. In this case the enclosure could cause the cell to heat up so that it can be recharged at a lower voltage and with less energy input.

Figure 3A:
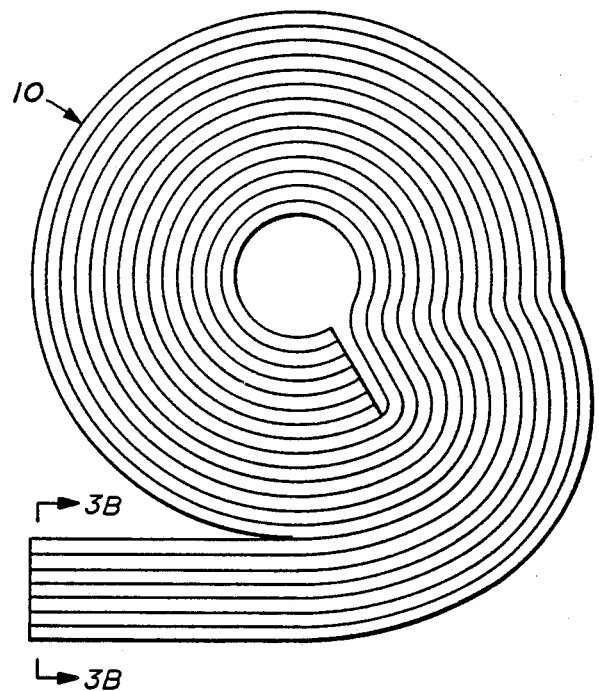
FIG. 3A is a schematic of a continuous sheet of single or series stacked thermovoltaic cells of the preferred embodiment of the present invention spirally wound to achieve increased current and power output per unit volume.
Figure 3B:
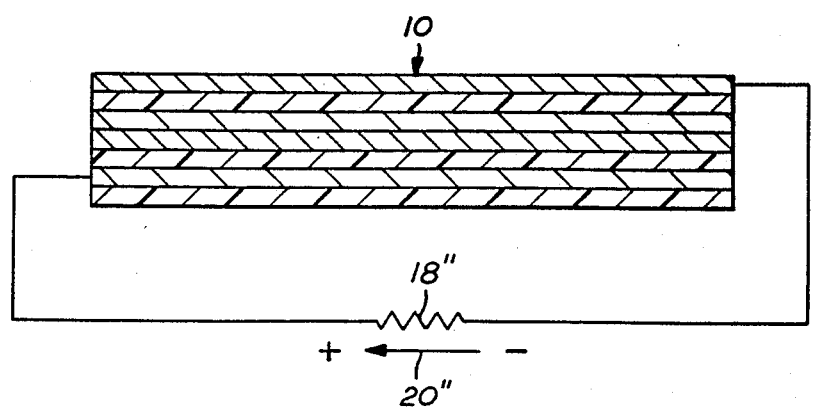
FIG. 3B is a cross-section of the cells taken along Section lines 3-B of FIG. 3A.
Figure 3C:
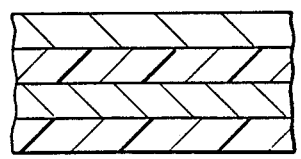
FIG. 3C is a schematic of a detail of the sheet of FIG. 3A.

FIG. 3 shows schematically how large sheets of single or stacked thin thermovoltaic cells 10 can be wound into a tight spiral to achieve high power/volume. The total current is the current per area times the total area in the spiral.

There are many practical ways of making Thermovoltaic cells and batteries 10 like those shown schematically in FIGS. 1, 2 and 3. Some of these techniques are:

1. Thin film vacuum deposition of metals and semiconductor layers by the same techniques used in manufacturing submicron electronic devices. For example, a 2000 Angstrom film of Au, Ag or Cu can be vacuum deposited on a silicon wafer. Then a 2,000 Angstrom film of $SiO_2$ can be sputtered atop this. Then a 2,000 Angstrom film of Al can be vacuum deposited atop this to complete the cell. Additional cells of 4,000 Angstroms in thickness can be stacked atop one another by repeating this process. The $SiO_2$ film can also be applied by the well known technique of spinning on a special liquid and thermally curing it with heat. Cells made this way may be limited by available equipment to small areas and they cannot usually breathe gases.

2. There is equipment available to vacuum deposit metals on plastics or aluminum sheets approximately 1.0 mil thick. As this sheet moves back and forth through a vacuum chamber, from one roll to another, the layers of metals and separators can be applied by thermal deposition or sputtering. The resulting product is like that shown schematically in FIG. 3. A laser beam could be used to cut the sheet into smaller stacked cells like that shown schematically in FIG. 2. Laser cutting in a vacuum would avoid short circuiting the cells at its edges. Kapton (polyimide) sheet is a plastic that can withstand 1,000° F., so the materials mentioned above could be applied to this substrate. Furthermore, the layers are so thin that the coated sheet would remain flexible. Such cells would be operable at elevated temperatures. Other plastic sheets and other separator materials can also be used but the temperature may be restricted. For example, organic polymers can be vacuum deposited using their monomer gases and ultra-violet light or a glow discharge to create free radicals that polymerize on the surface. Polyethylene, polystyrene, etc. are examples of films that have been manufactured by this technique.

3. Thin film metal oxide separators can be applied by spraying metal chloride or metal hydroxide solutions on hot surfaces (400° F.–1200° F.). This technique requires no vacuum, but is only good for materials that can withstand the heat.

4. EGD coating systems, as described in U.S. Pat. No. 4,433,003, issued Feb. 21, 1984, are particularly useful in manufacturing Thermovoltaic cells because they can apply uniform thin films of liquid or powder of any electrical conductivity. For example they can apply commercially available conductive paints, containing tiny metal particles, and non-metallic, semi-conductor liquid paints to serve as the separators. Stacked cells made this way do not breathe gases very well; however, if suitable powders are sprayed on in separate thin layers, excellent breathing capability is obtained. It should be noted that EGD powder coating produces well packed thin layers of material that cling tenaciously to the surface due to the strong electrostatic force that deposits the charged particles. EGD coating systems provide a convenient way to insulate the edges of cells, and to provide porous or nonporous thermal enclosures of insulating material for batteries.

In mass producing such cells there is a distinct advantage to using the EGD powder or liquid coating system to apply either the dielectric spacer (porous powder or liquid), or the conductive surfaces (powder or liquid) on either metal foil, or on plastic sheet.

For example, one mil thick polyester sheet can be EGD coated on one side with porous carbon paint 12 (powder or liquid) as it is rolled off one spindle onto another. Then, it can be EGD coated on the other side with Ag paint 14 as it is rolled back onto the original spindle. Finally, one side can be coated with a porous dielectric paint 16 (liquid or powder) as it is rolled off the original spindle and onto the final spindle. The cell is complete when an electrical connection is made between the Carbon and Silver through a suitable external load 18.

Another technique is to coat opposite sides of the plastic sheet with different metals in a vacuum deposition chamber, then EGD coat a porous dielectric powder (or paint) on one side while winding it tightly on a spindle. Then, the cell is completed by electrically connecting a suitable load between the two metals.

If aluminum or titanium foil is used instead of plastic sheet, two sheets are required; one to be coated with noble metal in a vacuum chamber, or with metallic paint by EGD. The two must be insulated from each other while winding together on a spindle. This can be done most conveniently by EGD coating a powder or porous paint dielectric on both of the surfaces just before they are rolled up. To complete the cell, electrical connections between the two foils must be made so that power can be delivered to a suitable external load resistance.

It is to be understood that the methods and materials described herein are illustrative and not to be taken as limiting the intention.

It follows from FIG. 7.7 of "THERMODYNAMICS OF SOLIDS"; Swalin, R. A., John Wiley and Sons, Inc. N.Y.; Copyright 1962 and the teachings of this invention, that a cell made with two identical metals sandwiching a semi conductor will have no net voltage or induced current. However, if the semiconductor is a metal oxide that forms a stronger bond with $O_2$ than the metal, such as $SiO_2$ sandwiched between copper, then if an external power supply is used to drive electrons across the cell, oxygen will also be dragged across the cell. Eventually, two dissimilar interfaces will be created; Cu—$Cu_2O$ and $SiO_2$—Si with a Cu connection to Si. When the external power supply is removed, the electron current flows in the opposite direction due to the open-circuit voltage of a Cu(+)-Si(−) cell. It should be noted that the induced voltage is the same as the applied voltage after the capacitively stored charge is removed. Using this method to build and start cells eliminates the need to handle and apply a second metal as discussed above.

When stacked or rolled cells such as those shown in FIGS. 2 and 3, respectively, are made of materials that are stable over a wide temperature range, and have $dV_{oc}/dT \neq 0$, it is possible to conserve recharging energy by recharging at a temperature where $V_{oc}$ is smaller, and discharging at a temperature where $V_{oc}$ is larger as discussed above. There are many convenient ways to change the battery operating temperature. The battery may be physically transported from one temperature reservoir to another. It may receive heat from a particular reservoir by gas convection. A small, low powered blower would suffice. The temperature reservoir can be maintained by energy from chemical combustion, solar radiation, nuclear or biological reactions. In the case of radiation, the battery environmental temperature can be changed by a radiation shield that can be physically adjusted to control the radiation reaching the battery environment.

FIG. 4 shows two cells A, B installed in ducts 40, 42. A movable vane 44 located in an inlet duct 46 can be used to direct hot combustion gases 48 alternatively over, for example, C—Ni cell A, or C—Ni cell B so that the upper rating temperatures of these cells A, B are ultimately above and below the critical temperature, T=250° C. discussed above, thereby rejuvenating the chemicals in each cell automatically as electric power is continuously generated.

Figure 5A:
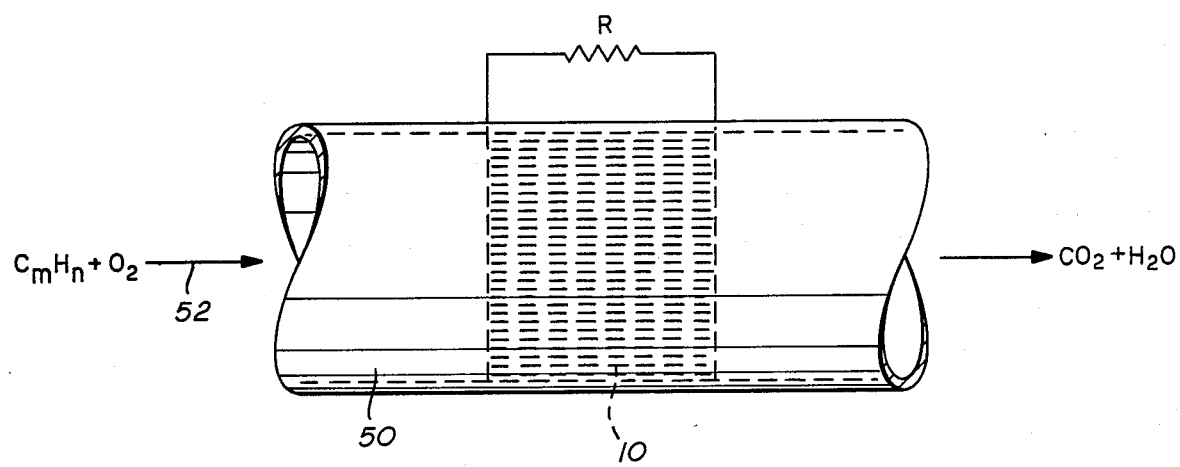
FIG. 5A is a schematic drawing of a thermovoltaic fuel cell of the preferred embodiment of the present invention.
Figure 5B:
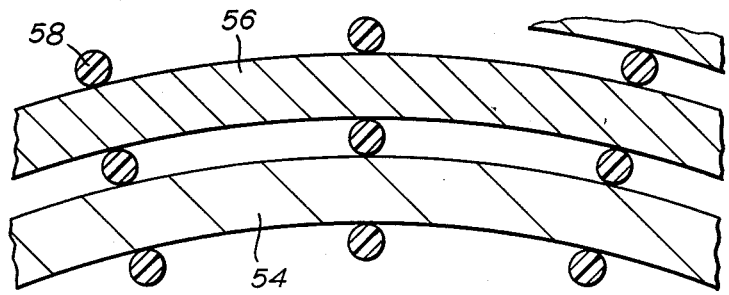
FIG. 5B is a detail of the cell of FIG. 5A.

As shown in FIG. 5, stacked or wound Thermovoltaic Cells 10, as in FIGS. 2, 3, of the preferred embodiment, are installed in duct 50 through which a hydrocarbon and air mixture of gases 52 is forced to flow. If the cell 10 is of the C (−)—Ag (+) type having sheets C(−) 54 and Ag(+) 56 and dielectric spacer 58 (FIG. 5B); then, the Ag acts as a catalyst in forming O$^{--}$ on its surface, and O$^{--}$ oxidizes the hydrocarbon molecules $C_m H_n$ of stream 52 absorbed in the pores of the Carbon 54 as shown in FIG. 5. The net reaction is:

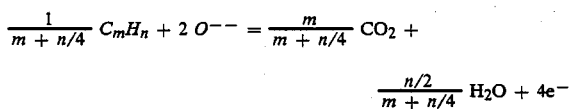

with a free energy change $\Delta G°_{1,2}$ and an open circuit voltage $V_{oc} = \Delta G°_{1,2}/4e$. This is a form of fuel cells in which chemical energy of the hydrocarbon air mixture is converted directly and continuously to electricity without altering the constituents of the cell.

The main advantage of Thermovoltaic fuel cells over conventional fuel cells is its simplicity of construction and higher power and energy densities.

Figure 6:
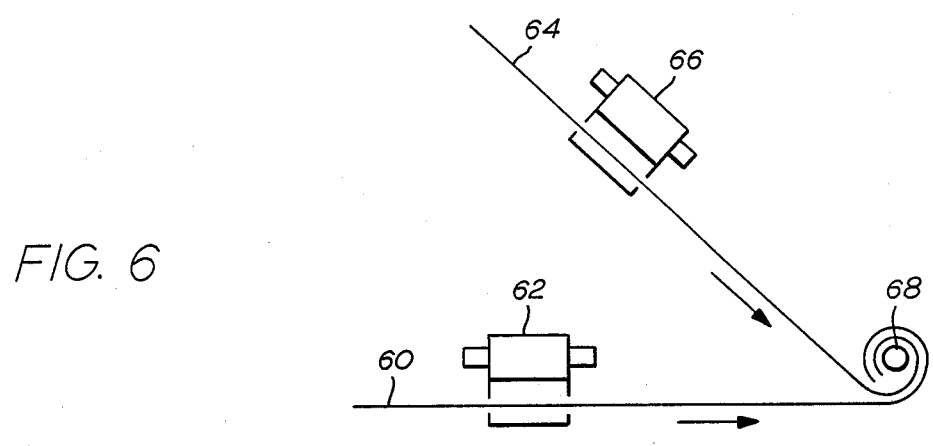
FIG. 6 is a schematic showing the construction of a coal oxidizing thermovoltaic battery of the preferred embodiment of the present invention using two electrogasdynamic coating systems.

FIG. 6 shows one sheet of paper 60 approximately 1 mil thick passing through an EGD powder coating chamber 62 and receiving a very thin coating of graphite (not shown) and another sheet of paper 64 passing through another EGD coating chamber 66 receiving a thin coating of pulverized coal (not shown). Then these two sheets are wound on a spindle 68 to form the thermovoltaic cell. The left end of one sheet is masked and left bare while the right end of the other sheet is masked and left bare so that it is easy to make an electrical connection to the graphite at one end of the coil and the coal at the other end of the coil. Such a coil can generate 10 watts/20 lbs. for one year. Hence, a 1 kilowatt power supply will weigh 1 ton and occupy approximately 1 cubic meter. It is convenient to make a coil weighing approximately 20 lbs. so that they are easy to handle; after one year, the 100 coils can be burned in the fireplace like firewood. And another supply of cells would be installed. This is a clean and efficient way of using pulverized coal to make electricity and heat. It should be noted that to achieve this power density, the cell has to be operated in a warm and humid environment to reduce the resistivity of the paper separator.

Other cells having various combinations of materials applied by a wide variety of techniques may also be used; and as set out above, materials of construction and construction techniques should not be considered as limiting. For example, copper/copper oxide/coal, in which the copper oxide was formed by heating copper sheet metal in air, and the pulverized coal was applied by EGD as the cell was spirally wound may be used. Aluminum/graphite paint with separators of Sodium Hydroxide, or sodium chloride or Aluminum chloride, etc., all applied with an EGD liquid spray may be used. Copper/aluminum oxide powder/Aluminum in which the aluminum oxide was applied as a suspension in water with a small amount of alkaline silicate binder may be used. Graphite/magnesium oxide/graphite in which 1% magnesium sulfate and water are used as the binder may be used. Aluminum/aluminum phosphate/graphite, in which the Aluminum phosphate was applied as a liquid film and cured may be used. Aluminum/sodium aluminate/graphite in which the sodium aluminate was formed by applying a liquid coating of sodium hydroxide and methyl alcohol may be used. All of these cells would behave qualitatively as predicted by theory; however, each type has advantages and disadvantages when it comes to making stacked or rolled cells connected in series or parallel. All of these cells could deliver the same specific power close to room temperature in a humid environment as that produced at elevated temperatures. In some cases, nitrous oxide is also effective in reducing separator resistivity just as much as water vapor. Small cells operating at low temperatures can be made with paper separator or with a positive electrode of paper treated with graphite paint, etc. For example, a sheet of aluminum foil approximately 1 mil thick and a sheet of graphite impregnated paper approximately 1 mil thick may be wound together on a common spindle. The winding could be done in an EGD coating chamber so that a thin coating of aluminum oxide powder separated the two sheets. Their edges could be displaced slightly from one another so that the two ends of the coil could serve as terminals of the cell. Other techniques for winding cells could also be used. Cells could be wound connected in series on a common spindle so that the voltage between the metal spindle and the last cell equals the voltage/cell times the number of cells. As an example, consider cells comprised of aluminum foil as the negative electrode and graphite impregnated paper as the positive electrode with the separator being aluminum oxide powder. The method includes the winding of aluminum foil from a coil on the left side and coated paper from the coil on the right side onto a common metal spindle in the middle that is turning clockwise. The process is begun by gluing the leading edge of the foil to the top of the spindle with a conductive cement. After turning it clockwise at least one revolution, the leading edge of the coated paper is glued with a non-conductive cement to the aluminum foil at the bottom of the spindle. The winding is continued while being subjected to a turbulent cloud of charged aluminum oxide particles established by EGD spray nozzles so that the aluminum foil and the graphite coated paper are electrically separated from one another by a thin layer of oxide. After numerous revolutions, the first cell would be complete, and the aluminum foil is cut near the top of the spindle. After discontinuing the spray and rotating at least one more revolution, the leading edge of the aluminum foil would be reconnected to the graphite with conductive cement at the top of the spindle. The paper is cut at the bottom of the spindle before rotating at least another revolution; and then, the graphite paper is reconnected with a non-conductive cement to the foil at the bottom of the spindle. Winding could then be continued in the presence of the EGD spray to form a second cell, which is connected in series to the first cell; e.g. the negative aluminum electrode of the second cell is connected electrically to the positive graphite electrode of the first cell. This process can be repeated until N cells are wound onto the spindle, and at least one revolution is made with the aluminum sheet cut at the top of the spindle so that the graphite impregnated paper covers the battery for at least one revolution at the end of the winding. This is the positive electrode of the series wound battery, with respect to the negative electrode, the metal spindle. While the above description focuses attention upon oxygen ions as the charge carrier responsible for the oxidation-reduction reaction in thermovoltaic cells, this is only because oxygen is one of the primary constituents of air in which these batteries would normally operate. It should be noted that many other materials could be used. For example, water, carbon dioxide, and carbon monoxide are also constituents of air and could serve the same function as oxygen. Also, cells can be built in which other negative ions such as the halogens (Bromine, Chlorine, Iodine, and the like) can serve the same function as oxygen. In "THERMODYNAMICS OF SOLIDS"; Swalin, R. A., John Wiley & Sons, Inc. N.Y.; Copyright 1962, there is a plot of $\Delta G°$ vs. T for metals reacting with sulfur, and it is possible to generate tables like this for metals reacting with phosphorus or the halogens for other cell examples. The examples above are not meant to exclude other possible thermovoltaic cells, but are meant to be illustrative of all possibilities.

Because many varying and different embodiments, as illustrated above, may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. The Thermovoltaic cell, comprising:
   a first metal;
   a second metal;
   a non-metal adjacent to and between said first metal and said second metal; said first and second metals having a different oxidation-reduction reaction occurring at the interface with said non-metal;
   wherein the molecules are easily ionized molecules; and wherein the molecules are nitrous oxide.

2. The battery, comprising:
   a container;
   a series of electrically connected cells located in said container;
   leads connected to said series of cells;
   each of said cells including
      a first set of thin laminations of a first metal;
      a second set of thin laminations of a second metal;
      a non-metal portion adjacent to and between said first set and said second set, said non-metal portion being sufficiently porous to allow negative valence molecules to pass through;
   wherein there is further included a thermal enclosure containing said container and said container is porous.

3. The battery of claim 2, wherein said thermal enclosure is removable.

4. The battery of claim 2, wherein said thermal enclosure includes a small quantity of easily ionized metal vapor.

5. The battery of claim 4, wherein said metal vapor is from the group Cs, Li, Na, K, Rb.

6. The battery of claim 5, wherein said metal vapor is Cs.

7. The battery, comprising:
   a container;
   a series of electrically connected cells located in said container;
   leads connected to said series of cells;
   each of said cells including
      a first set of thin laminations of a first metal;
      a second set of thin laminations of a second metal;
      a non-metal portion adjacent to and between said first set and said second set, said non-metal portion being sufficiently porous to allow negative valence molecules to pass through;
   wherein said container is located in a high humidity environment.

* * * * *